United States Patent [19]

Cross

[11] 4,096,615

[45] Jun. 27, 1978

[54] TURBINE ROTOR FABRICATION

[75] Inventor: Kenneth R. Cross, Lebanon, Ind.

[73] Assignee: General Motors Corporation, Detroit, Mich.

[21] Appl. No.: 802,020

[22] Filed: May 31, 1977

[51] Int. Cl.$^2$ .................. B23P 15/04; B23K 19/00
[52] U.S. Cl. .................. 29/156.8 R; 29/420.5; 29/447; 228/175; 228/186; 228/193; 75/226
[58] Field of Search .................. 29/156.8 R, 156.8 B, 29/420.5, 420, 447; 228/175, 186, 193, 127; 75/226

[56] References Cited

U.S. PATENT DOCUMENTS

| | | | |
|---|---|---|---|
| 1,884,252 | 10/1932 | Robinson | 29/156.8 R |
| 2,479,039 | 8/1949 | Cronstedt | 29/156.8 R |
| 2,769,611 | 11/1956 | Schwarzkopf | 29/447 |
| 2,913,819 | 11/1959 | Andreotti et al. | 29/420.5 |
| 3,429,700 | 2/1969 | Wiegand et al. | 29/420 |
| 3,590,454 | 7/1971 | Brass | 29/156.8 B |
| 3,803,702 | 4/1974 | Bratt et al. | 29/420.5 |
| 3,837,068 | 9/1974 | Dunn | 29/420.5 |
| 3,904,101 | 9/1975 | Beltran et al. | 228/175 |
| 3,940,268 | 2/1976 | Catlin | 29/156.8 R |

FOREIGN PATENT DOCUMENTS 2,173  1/1971  Japan .................. 228/127

Primary Examiner—Carl E. Hall
Assistant Examiner—Daniel C. Crane
Attorney, Agent, or Firm—J. C. Evans

[57] ABSTRACT

A method for manufacturing a hybrid, dual property turbine wheel assembly comprising the steps of preforming a blade element and separate support ring of a superalloy material and locating the blades in support slots in the outer diameter of the support ring and radially outwardly of a preformed inner diameter underlying base tangs on each blade element; vacuum braze sealing each of the base tangs within a support slot and thereafter machining the inside diameter of the ring to expose the base tangs; thereafter joining the ring and undercut base tangs thereon to the outside diameter of a preformed disc element and vacuum braze sealing the hub disc and ring blade assemblies to produce a sealed interface region between the outside diameter of the hub element and the inside diameter of the ring and base tangs; and thereafter directly hot isostatically pressing the joined parts to form a direct diffusion bond between the tangs, ring and disc.

4 Claims, 9 Drawing Figures

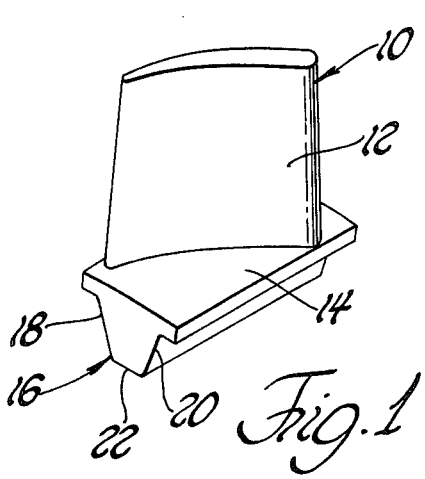
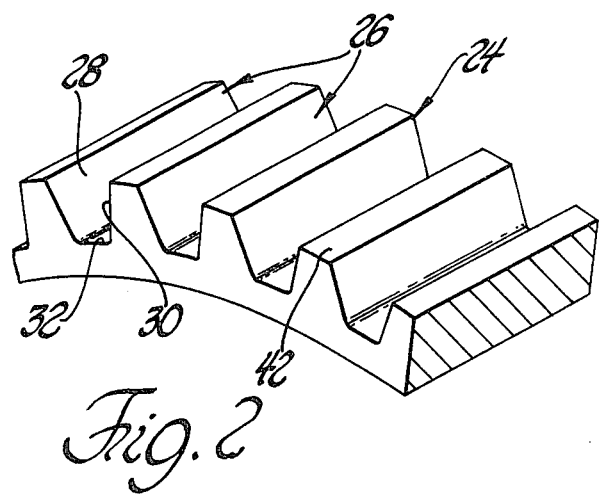
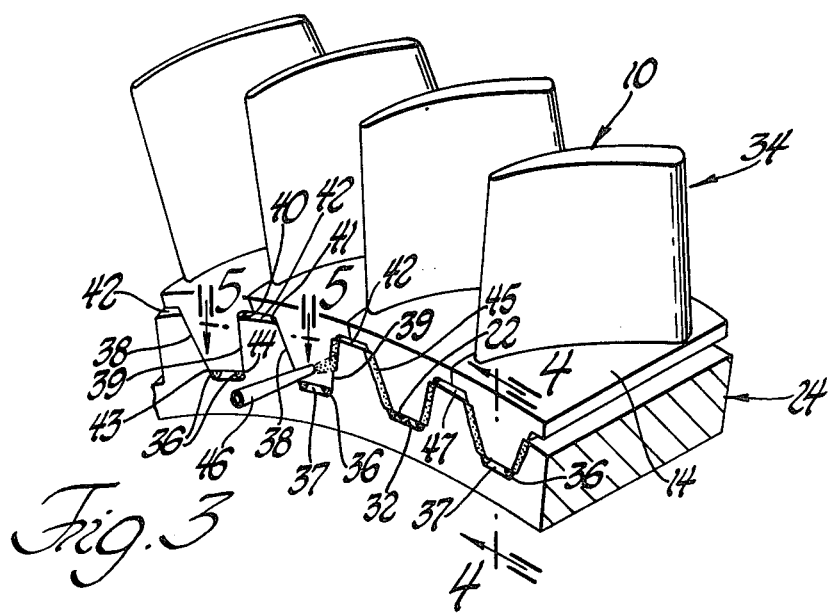
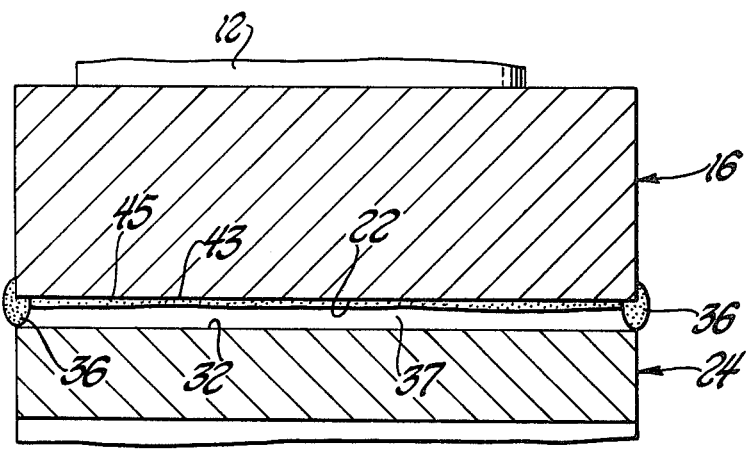
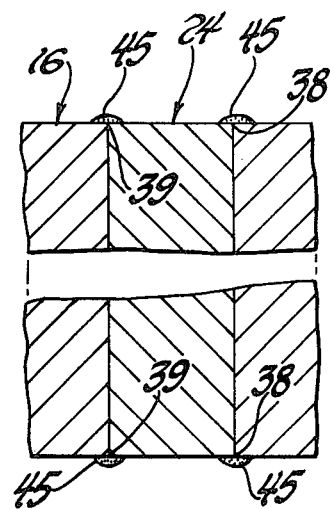

TURBINE ROTOR FABRICATION

This invention relates to hybrid turbine rotor assemblies with parts of dissimilar metallurgical properties and more particularly to a method for assembling such hybrid turbine rotors.

Gas turbine rotors used in small gas turbine engines have discs and airfoil arrays that are dimensionally configured to make it difficult to mechanically connect blades of a first metallurgical composition to a disc of a second metallurgical composition. More specifically, it is recognized that the airfoil components of a turbine wheel are subjected to higher temperature operation and are preferably of a heat resistant superalloy material; while the material of the disc should have substantial ductility to withstand high stresses produced at the hub thereof.

For example, one such hybrid turbine rotor is set forth in U.S. Pat. No. 2,479,039, issued Aug. 16, 1949, to D. Cronstedt. It is made by multi-stage centrifugal casting method and applies to large turbine rotors. It is difficult to mechanically couple the turbine disc of small gas turbines by conventional joints and coupling components to a blade array. Accordingly, in U.S. Pat. No. 3,940,268, issued Feb. 24, 1976, to John T. Catlin, a disc of powdered metal material is connected to a plurality of radially outwardly directed airfoil components by locating them in a mold and producing a metallurgical bond between the airfoil components and the disc during a hot isostatic formation of the disc or hub element. While blades can be bonded to a disc of a differing material by the method set forth in the aforesaid Catlin patent, hybrid or composite turbine rotor structures formed by such methods lack precision, dimensional control between adjacent airfoil components. Such control is required to maintain desired gas flow passages through adjacent ones of the airfoil components connected to the disc. Such dimensional imprecision is especially undesirable in the case of small, high speed gas turbine rotors.

In order to achieve accurate dimensional relationship between separate airfoil components in a turbine configuration, one method includes machining of the airfoil components to exact dimensional shapes and thereafter assembling the individual ones of the airfoil components in precisely machined slots in a rotor disc.

This turbine assembly method is set forth in U.S. Pat. No. 3,590,454, issued July 6, 1971, to Edward A. Brass. The premachined pieces are fitted together and advanced by a movable platform with respect to a powerful cathode ray gun which impinges on the various joints formed between blades and the wheel disc to produce a side weld across the exposed joints as well as weld penetration to a suitable depth dependent upon the welding duration and the intensity of the cathode rays. The method requires removal of substantial quantities of material from the parts to be joined and further requires the use of high energy electron beam welding equipment and preprogrammed movable fixture devices to achieve resultant connection between the component parts of the blade array and the disc component of the rotor assembly.

Each of the aforesaid methods for manufacturing a turbine wheel assembly with a disc of a first metallurgical composition and an airfoil array of a second metallurgical composition requires fixtures to locate the respective parts. The present invention includes a part positioning component as an integral part of the completed hybrid turbine wheel assembly.

Accordingly, an object of the present invention is to improve methods of manufacturing hybrid turbine wheels by use of a preformed element in the form of a fixture ring having blade carrying slots therein to receive base portions of individual airfoil elements; the slots being preformed to precisely align each of a plurality of airfoils in a precise aerodynamic relationship prior to assembly of the airfoil array into a diffusion bonded relationship with a preformed turbine disc of the wheel assembly whereby the fixture ring becomes part of the wheel assembly thereby to eliminate the need for separate fixturing devices as heretofore required to join separate airfoil type blade elements in a ring prior to their assembly to a separate disc part.

Another object of the present invention is to improve the manufacture of hybrid turbine wheel assemblies for use in high speed, small gas turbine engine applications by the provision of an improved method that includes preformation of individual, precisely configured airfoil blade elements each having a base segment thereon with a dependent tang; further preforming an intermediate ring element having a plurality of slots thereon preformed to receive the base of each airfoil blade to precisely locate the individual ones of the airfoil blades at a dimensional relationship to maintain desired aerodynamic flow paths through the airfoils; preforming a disc of the hybrid assembly from consolidated powder metal formed nearly to precise dimensions and including the step of machining the outer diameter of the disc to form a precisely controlled OD diameter thereon; thereafter preassembling the individual blades into the intermediate preformed ring components and vacuum braze sealing joints between the blades and ring; and then hot isostatically pressing the joined blades and ring to diffusion bond all the joints between the blades and the ring; thereafter machining the ID of the ring to expose tangs on the preformed airfoil element with the ID of the ring being closely controlled to produce a press fit of the ring to the outer diameter of the disc during a shrink or taper fit connection of the disc to previously joined blade and ring; thereafter vacuum braze sealing end face joint lines between the outer diameter of the disc and the inside diameter of the ring on either side of the joined parts to completely seal a butt joint interface therebetween partly defined by ring segments and partly defined by blade tangs; and thereafter hot isostatically pressing the entire assembly by direct application of elevated temperature and pressure thereagainst to press the butt joint interface together to form a diffusion bond therebetween connecting the tangs of individual blades to the disc rim and connecting the ring to the rim so as to establish a critical highly efficient metallurgical joint between all of the blades and their supporting disc.

Further objects and advantages of the present invention will be apparent from the following description, reference being had to the accompanying drawings wherein a preferred embodiment of the present invention is clearly shown.

FIG. 1 is a view in perspective of a single airfoil component;

FIG. 2 is a perspective view of a fragment of a ring component of the hybrid rotor assembly of the present invention;

FIG. 3 is a view showing single airfoil components of FIG. 1 connected to the ring of FIG. 2 by tack welds and braze sealed joints;

FIG. 4 is a sectional view taken along the line 4—4 of FIG. 3;

FIG. 5 is a fragmentary top elevational view taken along the line 5—5 of FIG. 3;

Figure 6:
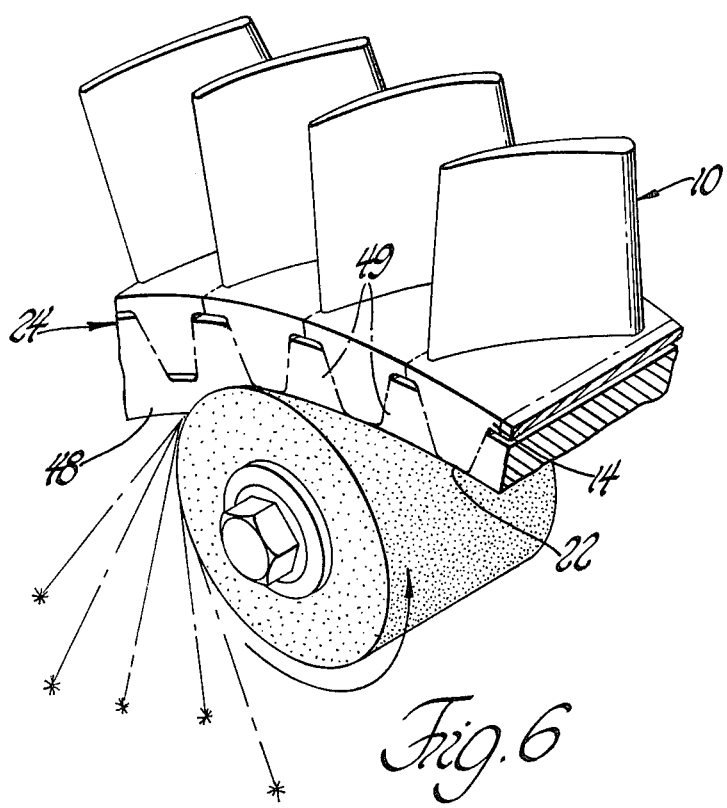
FIG. 6 is a perspective view of the ring and blades of FIG. 3 with a portion of the ring removed to expose tangs on individual blades in the preassembly of FIG. 3.

Referring now to the drawings, FIG. 1 shows a preformed, cast blade 10 having an airfoil 12 formed thereon joined to a rim 14. The rim 14 includes a dependent, tapered wedge base 16 having convergent side walls 18, 20 thereon that connect to a bottom 22. Preferably the blade 10 is formed from a heat resistant high alloy material which can be highly solidified. It also can be air cooled as taught in U.S. Pat. No. 3,732,031, issued May 8, 1973, to Charles E. Bowling et al. for Cooled Airfoil.

FIG. 2 shows an enlarged, perspective view of a ring element to position individual blade components such as shown in FIG. 1 into a solid ring for subsequent assembly to a disc component of a hybrid rotor assembly with a metallurgical composition dissimilar to that of each of the blades 10.

More particularly, the ring 24 is illustrated as having a plurality of blade retention slots 26 thereon having side walls 28, 30 and a slot bottom surface 32 with a configuration to locate the side walls 18, 20 and bottom 22 of the individual blades 10 accurately in the ring 24.

In accordance with the improved method of the present invention, the preformed blades 10 of FIG. 1 and the preformed ring having the configuration in FIG. 2 are joined so that the individual blades 10 are accurately located with respect to one another as shown in FIG. 3 to maintain dimensional accuracy between the surfaces of the blades to define air flow passages which maintain desired aerodynamic characteristics through a resultant continuous circumferentially formed airfoil array 34, a portion of which is shown in FIG. 3.

Following preformation of the individual blade elements 10 and the locating ring 24 as shown in FIGS. 1 and 2, respectively, the method includes the step of pressing each of the blade elements 10 into a mating slot 26 and thereafter tack welding each of the blade elements as shown at 36 in FIG. 3 at the bottom 22 of each of the blade elements. At this point in the method, the bottom surface 32 is spaced from the blade bottom 22 by a gap 37.

When all blades 10 are tack welded in place, exposed joint lines 38, 39 are formed at each end surface. Upper joint lines 40, 41 are formed at the top surfaces 42 of the ring 24 and either side of the top walls 18, 20. Also, lower joint lines 43, 44 are formed at the bottom of walls 18, 20 and walls 28, 30. All of these exposed joints are sealed by a silicon-boron modified braze alloy powder cover 45.

Thereafter, the subassembly in FIG. 3 is vacuum braze sealed by exposing the joined parts along with the cover of powder 45 through a vacuum brazing cycle as follows. Before the powder cover 45 is placed on all the exposed joint lines of the parts they are vacuum outgassed at 2200° F for 1 hour. Thereafter, the joint lines 38, 39, 40, 41, 43 and 44 are covered by a layer of silicon-boron modified braze material. In the illustrated arrangement a powder applicator tool 46 is inserted in gap 37 to cover joint lines 43, 44. Applicator 46 also fits in a gap 47 between rim 14 and ring 24 to cover joint lines 40, 41.

Materials suitable for practicing the invention are set forth below:

|  | Si | C | Cr | Co | Mo | W |
|---|---|---|---|---|---|---|
| Elements 10, 24 | 0 | 15 | 9.0 | 10.0 | 2.5 | 10.0 |
| Element 50 | 0 | — | 12.7 | 9.4 | 1.9 | 4.0 |
| Braze Powder | 2.5 | .17 | 10.0 | 9.7 | .6 | 10.8 |

|  | Ta | Ti | Al | B | Zr | Hf | Ni |
|---|---|---|---|---|---|---|---|
| Elements 10, 24 | 1.5 | 1.5 | 5.5 | .02 | .05 | 1.0 | Bal. |
| Element 50 | 3.8 | 4.1 | 3.7 | .01 | — | .9 | Bal. |
| Braze Powder | 3.1 | 1.6 | 5.5 | 1.1 | .05 | 1.4 | Bal. |

Other suitable high alloy material examples are Inco 718 and Astroloy.

The braze sealed parts are maintained under vacuum and held at a temperature of 2250° F for thirty minutes; thereafter the parts are cooled to 2000° F and held at that temperature for ten minutes for solidification of sealant layer defined by powder cover 45. Subsequently, the temperature is raised to 2100° F for one hour to allow the diffusion of boron and silicon into the base metal of blades 10 and ring 24 to elevate the remelt temperature of the seals.

After sealing the joint lines the brazed assembly is visually inspected for integrity and leak checked by placing it in a chamber of high pressure helium gas. After an appropriate exposure period, the sealed joints are checked with a spectrometer for possible helium bleed back through pin hole or microscopic flaws in the braze seal that covers the joint lines.

The assembly is then hot isostatic press (HIP) bonded at pressures to 15 KSI at temperatures to 2225° F for 3 to 4 hours to achieve a diffusion bond across the interface of the slotted ring 24 and wedge surfaces of the individual blades 10. Press time, temperature and pressure depends upon equipment used.

Thereafter, the joined blade 10 and ring 24 are machined as shown in FIG. 6 to remove a layer 48 of material from the inside diameter of the ring 24. The depth of the layer 24 is selected so that bottom 22 of each of the blades 10 are exposed along with spaced apart segments 49 of ring 24 that remain joined to the bases of the individual blade elements 10 following removal of the layer 48 of the material. The machining step shown in FIG. 6 removes the temporary tack welds 36 and inner joint lines 43, 44 thereby establishing a controlled inside diameter for the joined blades 10 and ring 24 and can remove a part of bottom 22.

Figure 7:
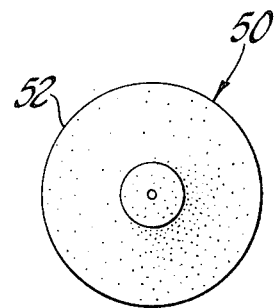
FIG. 7 is a side elevational view of a preformed powder metal disc used in the manufacture of hybrid turbine rotor wheels in accordance with the invention.
Figure 8:
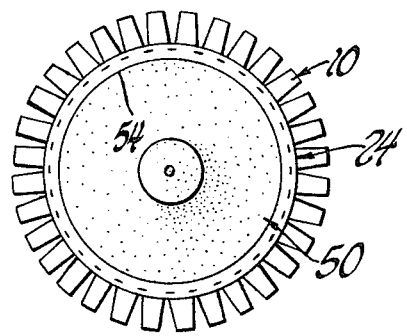
FIG. 8 is a side elevational view showing the machined ring and blade subassembly located on the outer periphery of a disc with braze sealed joint lines.

In FIG. 7, a preformed, near-net-shape hub or disc 50 is illustrated preferably of a consolidated powder metal having a high stress resistance. The disc 50 includes an outside diameter or rim 52 which has been premachined to an accurate diameter slightly less than that of the inside diameter formed in the assembly of FIG. 6 following the machining of the layer 48 of material therefrom.

The preformed subassembly in FIG. 6 is press fit on the outside diameter of the disc 50 by maintaining the preformed disc 50 in FIG. 7 at ambient conditions and heating the subassembly in FIG. 6 to 400° F to cause it to expand sufficiently to slip on to disc 50. Thereafter, the outer ring and blade components are cooled to cause the parts to be shrunk in place on disc 50. After shrink fitting, the blade bottoms 22 are located in intimate, unbonded contact with the outer rim 52 of the disc 50. The next step in the present invention is to apply the aforesaid boron-silicon braze alloy powder circumferentially to the front and rear faces of the joint disc ring along exposed butt joint lines 54, 56 on either side of the joined parts and thereafter vacuum brazing the parts in accordance with the above-described vacuum braze schedule. The parts are then effectively sealed with respect to one another and a butt joint as shown at 58 is formed continuously circumferentially around the near-net-shaped disc 50 and the joint blades 10 and ring 24. The joined parts are located on a stand 60 within an autoclave 62 and hot isostatically pressed by the previously described process.

The braze temperatures and braze alloy compositions are selected to be compatable with solution heat treatment requirements for the high alloy material from which the blades 10 and ring 24 are formed.

A high hot isostatic press temperature, in conjunction with the application of pressure in the range of 15,000 p.s.i. insures intimate contact between the exposed bottoms 22, the exposed surface segments 49, and the outside diameter or rim 52 of the disc 50 as parts are joined by diffusion bonding therebetween to produce a high quality metallurgical joint having a butt configuration completely circumferentially around the parts that are joined one to the other.

It has been noted that the boron-silicon modified braze material does not grain coarsen following exposure to the high processing temperatures. Moreover, benefits are obtained in terms of ductility enhancement from the relatively slow cooling rates. Furthermore, the aforesaid nickel base alloys are characterized by having a sluggish aging response and consequently effects on their strength characteristics are minimal.

By way of summary, typical sequences used in the present invention are as follows:

Typical Ring Fabrication Sequence

2225° F (1 hr.) — Vacuum outgas
2240° F (30 min.) — Vacuum braze cycle
2000° F (10 min.) — Braze alloy solidification
2100° F (1 hr.) — Braze diffusion cycle

Typical Braze Sealing Sequence

2225° F (1 hr.) — Vacuum outgas
2240° F (30 min.) — Vacuum braze cycle
2000° F (10 min.) — Braze alloy solidification
2100° F (1 hr.) — Braze diffusion cycle

Hot Isostatic Press Bonding

2225° F (3 hrs.) — HIP Cycle

Final Heat Treatment

2050° F (2 hr.) — Simulated coating diffusion cycle
+1600° F (24 hr.) — Age cycle The aforesaid typical processing sequences are preferred but will depend upon the metallurgy of individual parts and time, temperature and pressure which may depend upon different types of processing equipment.

The invention will produce a finished assembly with all interface joints diffusion bonded for high strength and with joints free of braze or weld material. By practicing the invention, fabrication of hybrid turbine wheels is accomplished where the disc and rim materials are selected to offer advantages required for specific location such as high alloy cast airfoils in a hot gas stream and high strength disc material for high speed operation.

Powdered metallurgical techniques are used to fabricate the disc for use in small size high speed gas turbine wheels. With the proper selection of parameters including pressure, time and temperature a fully dense, fine grain homogeneous disc structure can be obtained. The superior homogeneity of such powdered metallurgy discs is especially suited to improve their workability so that the outside diameter of the disc can be machined to closely control tolerances for use in the invention.

Figure 9:
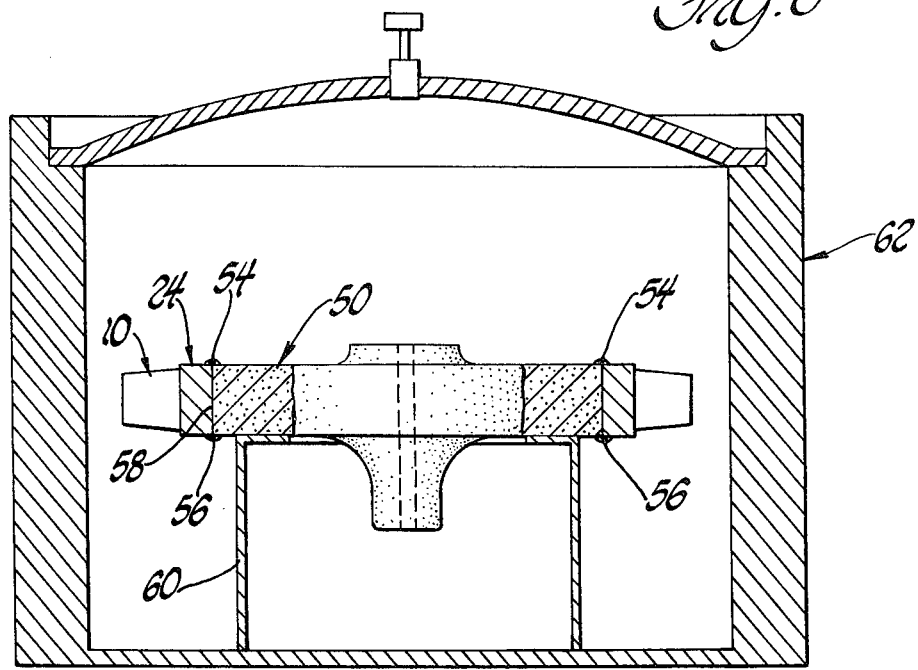
FIG. 9 is a diagrammatic view showing the assembly of FIG. 8 subjected to a hot isostatic press step.

The high temperature and pressures of the hot isostatic press are directly imposed on the joined parts as shown in FIG. 9 and do not require the interposition of mechanical presses or the like. Because of the high temperature and pressures listed above, reliable diffusion bonding of the dissimilar materials can be accomplished.

While the process noted above is specific to hybrid turbine structures it is also applicable to structures where part positioning components equivalent to the preformed ring 24 in FIG. 2 becomes part of the resultant structure so as to hold a first preformed number of metallurgical components in a close dimensional relationship which establishes a critical metallurgical joint having a butt configuration.

Further, preferably the braze alloy is applied as a slurry. The slurry is made of braze alloy powder and a liquid binder such as "Plastibond Cement" a commercially available product of Coast Metal Alloys Corporation or "Nicrobraz Cement" a commercially available product of the "Nicrobraze Corporation."

The use of a locating ring as set forth herein to support cast blades makes possible a reliable method of connection and dimension control without the problem of having any braze joints located in a radial plane in the finely fabricated, hybrid turbine wheel assembly.

While the embodiments of the present invention, as herein disclosed, constitute a preferred form, it is to be understood that other forms might be adopted.

The embodiments of the invention in which an exclusive property or privilege is claimed are defined as follows:

1. A method for fabricating a hybrid dual property wheel assembly comprising: preforming a plurality of blades with a base tang thereon, preforming a blade support ring including a plurality of circumferentially spaced blade position slots therein for receiving base tangs of each of said blades whereby adjacent blades are accurately dimensionally located one to the other, sealing each of said tangs within one of said position slots, thereafter machining the inside diameter of the joined blades and ring to expose portions of said blade base tangs, preforming a disc having a controlled outside diameter, press fitting the ring and blades to the disc to form a butt interface, sealing the hub disc and ring blade assemblies at joint lines on either side of the butt interface, thereafter hot isostatically pressing the joined blade, ring and hub disc components to form a diffused metallurgical bond between the blade base tangs, the ring and the disc at the interface therebetween.

2. A method for fabricating a hybrid dual property wheel assembly comprising: preforming a plurality of blades with a base tang thereon from a cast, corrosion resistant super alloy material, preforming a blade support ring including a plurality of circumferentially spaced blade position slots therein for receiving base tangs of each of said blades whereby adjacent blades are accurately dimensionally located one to the other, braze sealing each of said blade tangs at all exposed joint lines with each of said position slots hot isostatically pressing said braze sealed blades to said blade support ring to produce a diffusion bond therebetween, thereafter machining the inside diameter of the joined blades and ring to expose portions of said cast blade base tangs, preforming a disc of consolidated powdered metal having a controlled outside diameter, press fitting the joined ring and blades to the disc to form a butt interface therebetween, vacuum braze sealing the disc and ring blade assemblies at joint lines on either side of the butt interface, thereafter hot isostatically pressing the joined blade, ring and hub disc components to form a diffused metallurgical bond between the blade base tangs, the ring and the disc at the interface therebetween.

3. A method for fabricating a hybrid, dual property wheel assembly comprising: the steps of preforming a blade of a first predetermined high alloy material having a preformed wedge shaped base thereon, preforming a support ring for said blade element including a slot thereon including sloped walls to accept the wedge shaped base of said blade pressing each of said blade bases into one of said slots and tack welding each of the blades to the ring thereby to locate each blade on the ring, sealing each of the exposed joints between the blade base and the tapered walls of the slots on said ring, hot isostatically pressing each of said blades with respect to the support ring to diffusion bond across the interfaces of the slotted ring slot and wedge surfaces of individual blades, thereafter machining the inside diameter of the ring to a radius to expose a portion of the base of each of the blades, preforming a powdered metal disc, shrink fitting the ring and blade assembly to the outer diameter of the disc, sealing all exposed joint lines between the outer diameter of the disc and the inside diameter of the ring, and thereafter hot isostatically pressing the joined ring assembly and disc to produce a diffusion bond between the inside diameter of the ring, the exposed bottoms of the base of each of the blade elements and the disc.

4. A method for fabricating a hybrid, dual property wheel assembly comprising the steps of preforming a blade of a first predetermined high alloy material having a preformed wedge shaped base thereon, preforming a support ring for said blade element including a slot thereon including sloped walls to accept the wedge shaped base of said blade pressing each of said blade bases into one of said slots and tack welding each of the blades to the ring thereby to locate each blade on the ring, vacuum seal brazing each of the exposed joints between the blade base and the tapered walls of the slots on said ring, hot isostatically pressing each of said blades with respect to the support ring to diffusion bond across the interfaces of the slotted ring slot and wedge surfaces of individual blades, thereafter machining the inside diameter of the ring to a radius to expose a portion of the base of each of the blades, preforming a powdered metal disc, shrink fitting the ring and blade assembly to the outer diameter of the disc, vacuum braze sealing all exposed joint lines between the outer diameter of the disc and the inside diameter of the ring, and thereafter hot isostatically pressing the joined ring assembly and disc to produce a diffusion bond between the inside diameter of the ring, the exposed bottoms of the base of each of the blade elements and the disc.

* * * * *